US012611995B2

(12) United States Patent
von Mühlenen et al.

(10) Patent No.: US 12,611,995 B2
(45) Date of Patent: Apr. 28, 2026

(54) HOLDER FOR A MOBILE DEVICE

(71) Applicant: Foxylight AG, Zürich (CH)

(72) Inventors: Ivo Lars Oliver von Mühlenen, Zürich (CH); Christian Hegar, Murten (CH)

(73) Assignee: FOXYLIGHT AG, Zurich (CH)

( * ) Notice: Subject to any disclaimer, the term of this patent is extended or adjusted under 35 U.S.C. 154(b) by 384 days.

(21) Appl. No.: 18/020,427

(22) PCT Filed: Aug. 10, 2021

(86) PCT No.: PCT/IB2021/057388

§ 371 (c)(1),
(2) Date: Aug. 16, 2023

(87) PCT Pub. No.: WO2022/034507

PCT Pub. Date: Feb. 17, 2022

(65) Prior Publication Data

US 2023/0415666 A1     Dec. 28, 2023

(30) Foreign Application Priority Data

Aug. 10, 2020    (DE) .......................... 102020121049.3

(51) Int. Cl.
*B60R 11/02* (2006.01)
*B60R 11/00* (2006.01)
*F16M 11/04* (2006.01)

(52) U.S. Cl.
CPC ....... *B60R 11/0241* (2013.01); *F16M 11/041* (2013.01); *B60R 2011/0071* (2013.01)

(58) Field of Classification Search
None
See application file for complete search history.

(56) References Cited

U.S. PATENT DOCUMENTS

| | | | |
|---|---|---|---|
| 7,418,097 B2 | 8/2008 | Chang | |
| 2005/0072691 A1* | 4/2005 | Schlansky | G06F 1/1626 |
| | | | 206/472 |
| 2007/0045495 A1* | 3/2007 | Asano | B60R 11/0241 |
| | | | 248/316.4 |
| 2008/0234013 A1* | 9/2008 | Bury | H04M 1/04 |
| | | | 455/575.1 |
| 2012/0018595 A1* | 1/2012 | Berry | H04M 1/04 |
| | | | 248/316.7 |

* cited by examiner

*Primary Examiner* — Hemant S Patel
(74) *Attorney, Agent, or Firm* — HULTQUIST, PLLC; Steven J. Hultquist

(57) ABSTRACT

The invention relates to a holder (100) for a mobile device (200). Due to the wide variation of devices, conventional mounting devices that seek to hold many different devices have become complex and expensive. By providing rotatable edge clamps (110, 115) along with one or more serpentine extension resistances (120), a region of nonlinear resistance is provided to separate the first edge clamp (110) and the second edge clamp (115). This has the advantage of a lower rate of increase in separation resistance at greater separation distances compared to using a linear element, such as a coil spring.

24 Claims, 6 Drawing Sheets

HOLDER FOR A MOBILE DEVICE

CROSS-REFERENCE TO RELATED APPLICATIONS

This is a United States national phase under 35 USC § 371 of International Patent Application PCT/IB2021/057388 filed Aug. 10, 2021 and claims the priority under 35 USC § 119 of German Patent Application 102020121049.3 filed Aug. 10, 2020. The disclosures of all such applications are hereby incorporated herein by reference, in their respective entireties, for all purposes.

The present invention relates to a holder for a mobile device.

Device holding apparatus are generally well-known and commonly used to mount and uphold safely mobile devices such as mobile telephones, tablets, portable computers, GPS (Global Positioning System) receivers and PDAs (Personal Digital Accessories).

Due to a large variation in device dimensions and button positions, mounting mechanisms must be adjustable and provide a high degree of flexibility when accommodating a diversity of devices. For example, U.S. Pat. No. 7,418,097 describes a clamp for electronic apparatus that comprises two spring-loaded edge clamps (or arms) and a spring-loaded release element. The distance between the clamps is variable, and the mobile apparatus is clamped by sandwiching the apparatus between the clamps and moving the clamp together compresses its biasing spring. Pressing the release button releases the clamps, which separate due to their biasing spring to release the mobile apparatus.

However, accommodating a wide range of devices has led to complicated holders, such as those shown in U.S. Pat. No. 7,418,097, that are expensive to manufacture and prone to failure due to the large number of components.

One objective of the present invention is to provide an improved holder for mobile devices that has a simple structure and is thus robust, easy to use, uncomplicated and easy to manufacture.

In accordance with the invention, a mobile device holder is provided according to claim 1. By providing a region of nonlinear resistance to separation of the first edge clamp and the second edge clamp, compared to using a linear element, such as a coil spring, a lower rate of increase in separation resistance is achieved at greater separation distances.

Such a holder for a mobile device comprises a first and a second edge clamp, each extending along a first axis and formed and arranged to cooperate along a second axis to rigidly clamp opposing edges of the mobile device, wherein the second axis intersects the first axis.

Additionally, such a holder for a mobile device comprises one or more extension resistances formed and arranged to resist a separation of the first edge clamp and the second edge clamp along the second axis.

Additionally, such a holder for a mobile device comprises, a first edge ejector mechanically connected to the first edge clamp and constructed and arranged to turn the first edge clamp about the first axis to release a proximal edge of the mobile device when a first predetermined ejection force is applied against the first edge ejector.

The one or more extension resistances comprise one or more serpentine or zigzag shaped form elements formed and arranged to provide a region of nonlinear resistance to separation of the first and second edge clamps.

Another embodiment of a holder comprises a first edge clamp and a second edge clamp formed and arranged to rigidly clamp substantially parallel edges of a mobile device.

Embodiments of a holder comprise one or more extension resistances formed and arranged to resist a separation of the first edge clamp and the second edge clamp in a plane comprising the first axis and the second axis.

Embodiments of a holder comprise one or more extension resistances comprise one or more hinges between the extension resistance and the first and/or second edge clamp formed and arranged to provide a region of non-linear resistance.

Embodiments of a holder comprise one or more extension resistances having one or more hinges disposed along one or more of the two extension resistances or between one or more of the two extension resistances and the first edge clamp and/or the second edge clamp, the hinges being formed and arranged such that the one or more extension resistances provide a region of nonlinear resistance.

Embodiments of a holder comprise one or more hinges having one or more indentations, one or more notches, one or more grooves, one or more protrusions, one or more elevations, one or more ribs, one or more cross-sectional reductions, one or more tapers, one or more barrel sections, one or more hourglass sections, one or more spherical sections, one or more hemispherical sections, one or more cylindrical sections, or may have any combination thereof.

Embodiments of a holder comprise one and a second, or more, edge clamps, one or more extension resistances, one or more hinges, or any combination thereof, of one or more elastomers, or a combination of elastomers, wherein embodiments of a holder are preferably formed monolithically.

Particularly suitable elastomers are advantageously polybutadiene, synthetic rubber, silicone rubber or natural rubber, as well as other vulcanizable thermoplastics.

Embodiments of a holder comprise a first edge ejector formed and arranged to move the first edge clamp away from the second edge clamp to release the proximal edge of the mobile device when the first predetermined ejection force is applied against the first edge ejector.

Embodiments of a holder further comprise a first ejection protrusion mechanically coupled to the first edge ejector and formed and arranged to rotate the first edge clamp about the first axis when the first predetermined ejection force is applied against the first edge ejector, whereby the first ejection protrusion applies a second predetermined ejection force against the movable apparatus along a third axis, the third axis intersecting the first and second axes.

Embodiments of a holder further comprise a second edge ejector mechanically connected to the second edge clamp, and constructed and arranged to turn the second edge clamp about the first axis and/or move the second edge clamp away from the first edge clamp to release the proximal edge of the mobile device when a third predetermined ejection force is applied against the second edge ejector.

Embodiments of a holder further comprise one or more fasteners formed and arranged such that the holder is rigidly attachable to a support surface.

Suitable fasteners comprises a magnet, an electromagnet, a solenoid, a ferromagnetic metal, an adhesive, an adhesive pad, a hook fastener, a loop fastener, a threaded fastener, a threaded hole, a clamp, a spring clip, a latch, a pin, a recess, a protrusion, a groove, a bracket, a clip mount, a screw mount, a bayonet mount, a friction mount, a smooth surface, a fastener suction pad, an adhesive pad, an elastic cord, or any combination thereof.

In embodiments of a holder, the one or more fixing means are mechanically upheld to the first ejection protrusion.

In embodiments of a holder, the first embodiment and the second embodiment intersect substantially perpendicularly.

In embodiments of a holder, the second axis and the third axis intersect substantially perpendicularly.

In embodiments of a holder, the first predetermined ejection force is suitable for manual application by a human.

In embodiments of a holder, the first predetermined ejection force is suitable for manual application by a hand of a human.

In embodiments of a holder, the first predetermined ejection force is in the range of 6 to 10 Newtons.

In embodiments of a holder, a second edge ejector is mechanically connected to the second edge ejector and formed and arranged to rotate the first edge clamp about the first axis when the third predetermined ejection force is applied against the second edge ejector, whereby the second edge ejector applies a fourth predetermined ejection force against the mobile device along the third axis.

Advantageously, thereby, the second predetermined ejection force and the fourth predetermined ejection force are substantially different, similar, or substantially the same.

It is equally advantageous if the first predetermined ejection force and the third predetermined ejection force are substantially different, similar, or substantially the same.

It is equally advantageous if the first predetermined ejection force and the third predetermined ejection force are suitable for manual application by two portions on one hand of a human.

It is equally advantageous if the third predetermined ejection force is suitable for manual application by a human.

It is equally advantageous if the third predetermined ejection force is suitable for manual application by a human hand.

Further advantages and features are shown in the following figures.

DETAILED DESCRIPTION

Figure 1A:
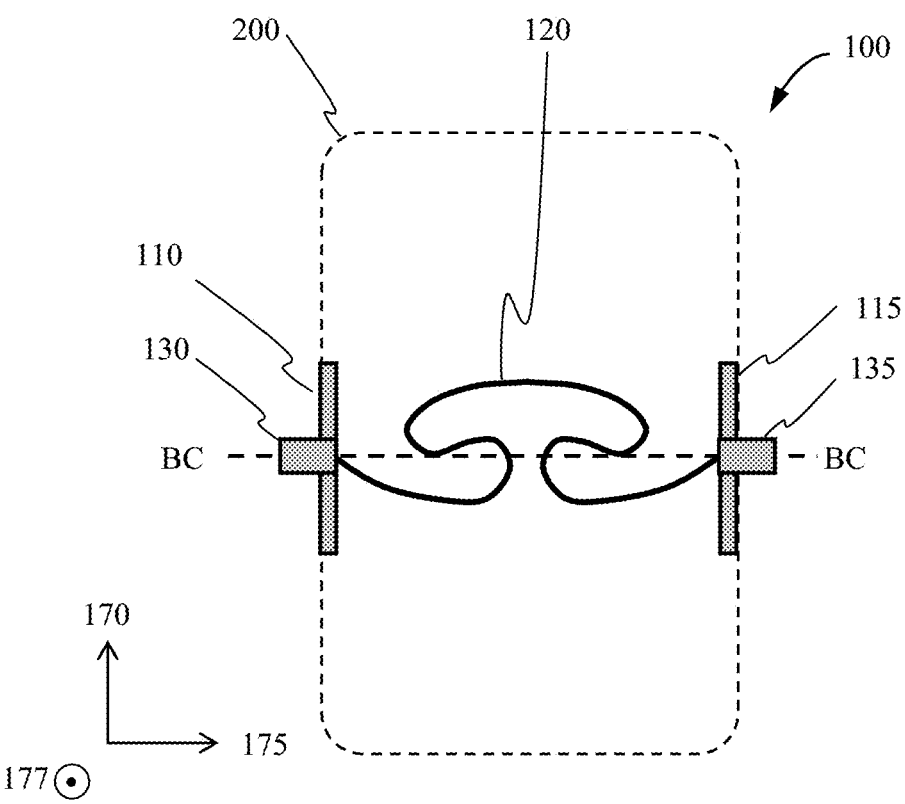
FIGS. 1A, 1B and 1C show a top view of a first embodiment of the holder of mobile devices and two cross-sections through the edge clamp.
Figure 1B:
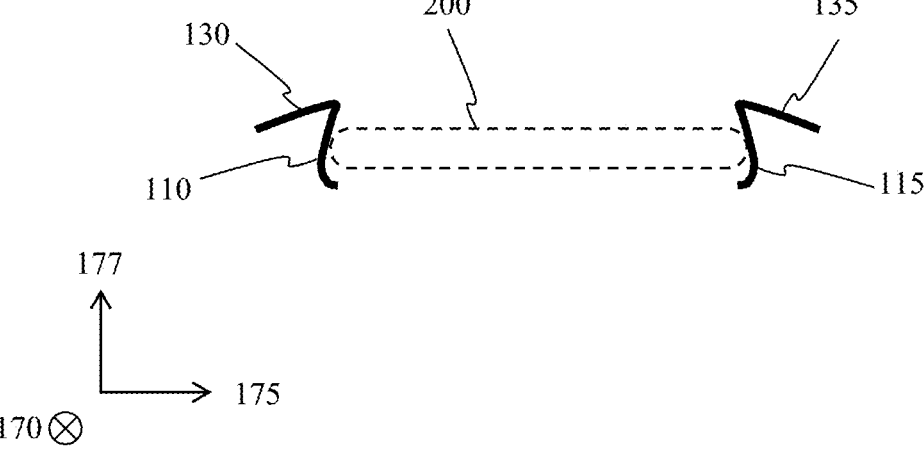
Figure 1C:
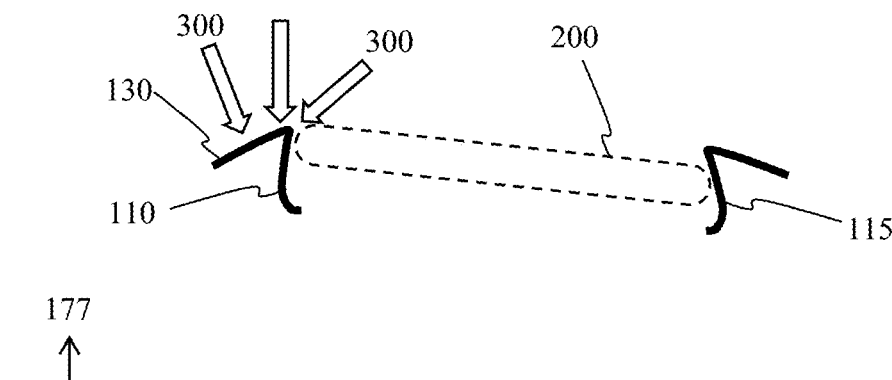

FIG. 1 shows a holder 100 for a mobile device 200. More specifically, FIG. 1A shows a top view of the holder 100 as seen from the side on which the mobile device 200 is inserted and/or removed. FIG. 1B shows a cross-sectional view of the edge clamp along the line BC-BC shown in FIG. 1A. FIG. 1C also shows a cross-sectional view of the edge clamp along line BC-BC, but one of the edge clamps is shown during ejection of the device.

The holder 100 comprises a first edge clamp 110 extending along a first axis 170, and a second edge clamp 115 also extending along a first axis 170.

The contour of the mobile device 200 is characterized by dashed lines.

Optionally, first edge clamp 110 and second edge clamp 115 may be formed and arranged to rigidly clamp substantially parallel edges of a mobile device 200 by being substantially parallel to each other. In embodiments in which the first edge clamp 110 and the second edge clamp 115 extend over a substantial portion of the edges of the mobile device 200, the uniformity of the clamping may be improved by having the first edge clamp 110 and the second edge clamp 115 substantially parallel to match the degree of parallelism of the edges of a typical mobile device 200.

The first edge clamp 110 and the second edge clamp 115 are formed and arranged to cooperate along a second axis 175 to rigidly clamp opposing edges of the mobile device 200. Typically, a force of up to 15 newtons (N) may be applied. The applied force may be related to the degree of movement expected during use. For example, lower forces may be used to clamp in a tabletop holder compared to a holder to be attached to a bicycle.

The second axis 175 intersects the first axis 170, and the angle between the first axis 170 and the second axis 175 may be predetermined depending on the expected external shape of the mobile devices 200 to be held. Currently, most mobile devices are substantially rectangular, so that it may be advantageous if the first axis 170 and the second axis 175 intersect substantially perpendicularly.

In the context of this description, the term "predetermined" refers to one or more of the following ways of determining values:

which have been determined during the design of the relevant portions using simulation data and/or measurements;

which are determined during use by measurements and/or by empirical ("try & error") (it is therefore predetermined for later use);

which are determined during use, which allows a dynamic determination and optionally a dynamic adjustment of the relevant parameter or the formation.

The holder 100 further comprises one or more extension resistances 120 which are formed and arranged such that they form a region of non-linear resistance against the separation of the first edge clamp 110 and the second edge clamp 115 along the second axis 175. In cases where the holder 100 is embodied for use with substantially planar mobile devices (200), it may be advantageous to provide the extension resistance in a plane which comprises the first axis 170 and the second axis 175.

It is at least one extension resistance 120 required which has a core body of serpentine or zigzag shaped form elements. Compared to coil springs, serpentine or zigzag (and referred to hereinafter only as serpentine) extension resistances 120 may be formed such that they have a suitable extension resistance characteristic by choosing and varying parameters such as the meander shape, the meander dimensions, the physical properties of the materials used, the cross-sectional shape and dimensions of the meanders, and the use of one or more hinges. In some embodiments, additional joints may be used between meanders to further modify the extension resistance characteristics. For example, it may resemble a rib rather than a meander.

A serpentine or zigzag extension resistance 120 allows a high degree of customization of the extension resistance characteristics.

For example, at separation distances which are only slightly larger than the expected device size, an initial resistance is present. Once this initial resistance is passed, a relatively lower resistance can be provided outside of this initial range of separation distances. This can make it easier for the user to remove the device 200.

For example, a holder 100 which has a substantially constant separation resistance over a wide range of separation distances can thereby more easily uphold a diversity of different sizes of mobile devices 200.

For example, a holder 100 which has a lower rate of increase in separation resistance at wider separation distances compared to using a linear element, such as a coil spring, may thereby more easily uphold a diversity of sizes of mobile devices 200. This is a common problem in which well-known holders, if they were to uphold very large (very wide) mobile devices 200, the force exerted by a linear spring would be too large for practical use.

In addition, the extension resistance characteristics can be further influenced by adding suitably formed elements, such as spring elements, spring wires, metal reinforcements, pairs of magnets formed either attractively or repulsively, elastic elements, additional elastic or elastomeric elements.

In addition, the extension resistance characteristic may be further influenced by one or more extension resistances 120 having one or more hinges (not shown in FIG. 1), wherein the one or more hinges may be disposed along the extension resistance 120 itself or between the extension resistance 120 and the first edge clamp 110 and/or second 115 edge clamp. Any suitable hinge configuration may be used as such a hinge, such as one having one or more recesses, one or more notches, one or more grooves, one or more protrusions, one or more raised portions, one or more ribs, or any combination thereof.

Additionally or alternatively, one or more reductions in material cross-sectional expansion (constriction) may also be used as a hinge. These one or more reductions in cross-sectional expansion may, for example, be substantially constant along their length, tapered, side-by-side and oppositely tapered, form a barrel-shaped profile, form an hourglass-shaped profile, form a substantially spherical profile, form a substantially hemispherical profile, form a cylindrical profile, or any combination thereof.

One or more hinges may be formed and arranged to provide additional rotation when needed. Additionally or alternatively, they may provide a target tensile volume, like a pivot joint. Such hinges may be used to further tune the degree of extension resistance 120 at different spacings of the first edge clamp 110 and the second edge clamp 115.

The one or more extension resistances 120 are formed and arranged such that they provide a relatively high resistance to separation of the edge clamps 110, 115 in the region of the separation distances for which the holder 100 is provided. This may reduce the risk of the mobile device 200 dropping out during use.

Tables of device dimensions are widely available, e.g., accessed online Aug. 6, 2020, at www.dimensions.com/subcategories/digital-types. Typically, mobile telephones can vary in width from 55 mm to 80 mm. Typically, tablets can vary in width from 70 mm to 225 mm.

It may therefore be advantageous to provide a variety of holders 100, each optimized to provide relatively higher extension resistance for a range of mobile device widths. For example, small corresponds to a range of 50 mm to 60 mm, medium corresponds to a range of 60 mm to 70 mm, and large corresponds to a range of 70 mm to 80 mm for mobile telephones. Similarly, differently optimized holders 100 may be provided to accommodate tablets 200 of various sizes.

Additionally or alternatively, the holder 100 may be formed and arranged to allow the user to choose or modify the range of usable widths. For example, by forming the extension resistances 120 such that they are replaceable by the user.

Additionally or alternatively, the separation distance between the first edge clamp 110 and the second edge clamp 115 may be adjustable, for example using a thread adjuster.

Additionally or alternatively, the holder 100 may be formed and arranged to allow a wide range of usable widths above a minimum. For example, a minimum spacing between edge clamps 110, 115 of about 35 mm to 40 mm for mobile telephones would allow upholding of simple telephones and a minimum spacing of about 52 mm for more complex telephones, such as smartphones. In which the extension resistance 120 would preferably be formed and arranged to achieve its minimum extension value.

Serpentine extension resistances 120 have the additional advantage that they are relatively flat, so that more compact device holders 100 can be manufactured. They can also be conveniently manufactured using techniques such as extrusion, molding, bonding, or 3D printing.

FIG. 1B shows a cross-section of the edge clamp along the line BC-BC shown in FIG. 1A. The contour of the cross-section of the mobile device 200 is shown by dashed lines. FIG. 1B shows the situation after the mobile device 200 is inserted, and the extension resistance 120 resists the edge clamps 110, 115 which separate from each other along the second axis 175.

The edge clamps 110, 115 are formed and arranged such that they clamp the edges of the mobile device 200 in that they form two opposing wall surfaces 110, 115 facing each other and extending along a third axis 177. These wall surfaces 110, 115 face the edges of the apparatus 200 when in use. The elongation along the third axis 177 may be determined based on the range of thicknesses of the mobile device to be accommodated. Typically, namely, mobile telephones may vary in depth (thickness) from 6.5 mm to 10 mm. Typically, namely, tablets may vary in depth (thickness) from 5.5 mm to 15 mm. The third axis 177 intersects with the first axis 170 and the second axis 175.

It may therefore be advantageous to provide multiple holders 100 each optimized, preferably cascaded, preferably in vertical height, for clamping a range of depths (thicknesses) of mobile devices. For example, small corresponds to a range of 6 mm to 9 mm, medium corresponds to a range of 8 mm to 12 mm, and large corresponds to a range of 11 mm to 16 mm.

Additionally or alternatively, the holder 100 may be formed and arranged to allow the user to choose or modify the range of usable depths. For example, by forming the edge clamp 110, 115 to be user replaceable. Additionally or alternatively, the elongation of the edge clamp 110, 115 can be adjusted along the third axis 177, for example by using a set screw thread.

Additionally or alternatively, the holder 100 may be formed and arranged to allow a wide range of usable depths up to a maximum. For example, the wall surfaces of the edge clamps 110, 115 may extend approximately 10.6 mm along the third axis 177.

Optionally, the wall surfaces of the edge clamps 110, 115 may have a profile to improve gripping of the opposing edges of the mobile device 200.

Currently, most mobile devices are substantially rectangular in cross-section, so it may be advantageous for the second axis 175 and the third axis 177 to intersect substantially perpendicularly.

Thus, the wall surfaces of the edge clamps 110, 115 may be substantially perpendicular to the second axis 175.

Optionally, one or more wall surfaces may be C-shaped or L-shaped in cross-section to reduce the risk of the mobile device 200 being ejected during normal use.

The term "ejection" is used in the context of the description to describe the removal of the mobile device from the holder 100. This may comprise steps that occur due to the shape and arrangement of the holder 100. For example, if the edge clamp 110 is C-shaped, then a corresponding rotation of the edge clamp 110 also effects the edge of the mobile device 200 being "lifted" (moved away from the holder 100). The "ejecting" may also comprise manual steps and/or manually assisted steps. For example, in some embodiments, the edge clamp 110 may separate from the edge of the mobile device 200, allowing the user to manually lift the edge of the mobile device 200 out.

Optionally, one or both wall surfaces of the edge clamps 110, 115 may be slightly inclined with respect to each other so that the separation distance is slightly smaller on the side of the mobile device 200 facing away from the holder 100 (the top side as shown in FIG. 1B and FIG. 1C). In other words, one or both of the wall surfaces of the two edge clamps 110, 115, when viewed in cross-section, may form an angle less than 90 degrees (less than perpendicular), preferably about 75 degrees, with the second axis 175.

The holder 100 further comprises a first edge ejector 130 mechanically connected to the first edge clamp 110 and formed and arranged such that it turns the first edge clamp 110 about the first axis 170. The edge ejector 130 may be located at any position on the first edge clamp 110 that is convenient for a user to reach when attempting to eject the mobile device 200. For example, as shown in FIG. 1A, it may be a tab that is rigidly fixed to the first edge clamp 110 on the side facing the user and away from the holder 100 (the top side, as shown in FIG. 1B and FIG. 1C). It may be attached at any suitable position along the first axis 170, and is preferably attached at a central position of the first edge clamp 110 to allow rotation over a large portion of the first edge clamp 110. More than one edge ejector 130 may be mounted at various locations along the edge clamp 110.

FIG. 1C shows a cross-sectional view of the edge clamps 110, 115 along the line BC-BC (shown in FIG. 1A) at the moment a proximal edge of the mobile device 200 is released from the first edge clamp 110.

As shown in FIG. 1C, the first edge ejector 130 is formed and arranged such that it rotates the first edge clamp 110 about the first axis 170 when a first predetermined ejection force 300 is applied to the first edge ejector 130. As this is used to eject the mobile device 200, the rotation of the edge clamp should be sufficient to release the proximal edge of the apparatus 200.

In practice, the user may not apply the force 300 at the most optimal position to the first edge ejector 130 with the most optimal direction to achieve optimal rotation. Therefore, the form and arrangement is such that a wide range of forces 300 which are applied at several different angles 300 is sufficient to eject the edge of the mobile device 200. Additionally, the effect of the shape of the wall surfaces of the edge clamp 110 and each angle should also be considered.

The holder 100 is similarly formed and arranged so that sufficient force can be applied to the first edge ejector 130.

The first edge ejector 130 is formed and arranged such that the proximal edge of the mobile device 200 is ejected when a human applies the first predetermined ejection force 300 as follows:

preferably manually, with one or two hands;
  preferably with one hand;

even more preferred is the use of only one or two fingers of one hand.

One finger can be an index finger or a thumb;
  best with one finger and thumb of one hand
  or a combination thereof.

Ergonomically, the preferred range for the first predetermined ejection force 300 is 6 to 10 Newtons (N).

It will be apparent to those skilled in the art that similar considerations apply when the mobile device 200 is inserted into the holder 100 to be rigidly clamped between the first edge clamp 110 and the second edge clamp 115. The main difference is that the user may be able to reach more positions of the holder 100, as they are not (at least initially) blocked by the mobile device 200 itself.

It may be advantageous to use a similar process and the same edge ejector 130 for inserting the apparatus 200 as for ejecting it. This makes the use of the holder 100 particularly intuitive.

It will also be obvious to those skilled in the art that only one of the edge clamps 110, 115 needs to be mechanically connected to an edge ejector (130).

For example, one of the edge clamps 110, 115 may be formed and arranged so as not to allow significant rotation and/or significant moving, wherein it would then act as a mechanical stop for the mobile device 200, and the insertion/ejection would have to be accomplished at the other edge clamp 110, 115.

It may also be advantageous to further form and arrange the first edge ejector 130 to move the first edge clamp 110 away from the second edge clamp 115 to release the proximal edge of the mobile device 200 when the first predetermined ejection force 300 is applied against the first edge ejector 130.

Thus, in addition to rotating about the first axis 170, additional movement may be provided to eject the proximal edge of the mobile device 200 more easily, reliably, quickly, or with less force.

Additionally or alternatively, the holder 100 may comprise a second edge ejector 135 which is mechanically connected to the second edge clamp 115 and formed and arranged such that it turns the second edge clamp 115 about the first axis 170 and/or moves the second edge clamp 115 away from the first edge clamp 110 to release the proximal edge of the mobile device 200 when a third predetermined ejection force (the second predetermined ejection force is described below) is applied against the second edge ejector 135.

Optionally, the holder 100 may be formed and arranged such that two edge ejectors 130, 135 are provided. They may be formed and arranged to be used alternatively, wherein each may be used to eject the mobile device 200. Combined use may also be allowable by, for example, forming and arranging the first predetermined ejection force 300 and the third predetermined ejection force to be substantially different, similar, or substantially the same.

The skilled person will recognize that the explanations in this disclosure relating to the formation and arrangement of the first predetermined ejection force 300 may be applied to the formation and arrangement of the third predetermined ejection force.

To the skilled person, it will also be apparent that the construction and arrangement of the two forces need to be substantially the same, that the construction, arrangement and formation of the edge ejectors 130, 135 and the corresponding edge clamps 110, 115 need not be substantially the same.

It may be advantageous to form and arrange the construction, arrangement and design of the edge ejectors 130, 135 and the corresponding edge clamps 110, 115 so that they are substantially the same. In this case, the holder may be used in either direction.

By suitably forming two edge ejectors 130, 135 and corresponding edge clamps 110, 115, it may be more convenient to form the holder 100 such that the first predetermined ejection force (300) and the third predetermined ejection force are suitable for manual application by two fingers on one hand of a human.

The mobile device 200 can then be removed with substantially simultaneous pressure from two fingers, wherein pressure is applied to both sides.

One of the parameters that can affect the use and influence the formation and arrangement of one or more forces are the materials used and the components used for these materials.

For example, the first edge clamp 110, the second edge clamp 115, the one or more extension resistances 120, the one or more hinges 125, or any combination thereof may be formed of one or more elastomers or a combination of elastomers, and these portions together are preferably formed as monolithic.

It is particularly advantageous if one or more elastomers are a polyurethane or a rubber.

When one or more elastomers are contained in the one or more extension resistances 120, use is preferably limited to the relevant elastic deformation range. For any materials used in the extension resistances 120, a significant amount of plastic deformation should preferably be avoided.

The use of one or more elastomers in the edge clamps 110, 115, in particular in the wall surfaces, is preferred as this reduces the risk of damage to the mobile device 200 during rigid clamping.

Although not shown in FIG. 1, the holder 100 may optionally comprise one or more fastening means formed and arranged to rigidly secure the holder 100 to a support surface (not shown). Examples of support surfaces include, but are not limited to, a desk, a vehicle dashboard, a vehicle sun visor, a vehicle handlebar, a photographic mount, a lighting fixture, a garment.

Depending on the type of bearing surface, the required fastening strength, and the desired appearance, the one or more fasteners may, for example. a magnet, an electromagnet, a solenoid, a ferromagnetic metal, an adhesive, an adhesive backing, a hook fastener, a loop fastener, a threaded fastener, a threaded hole, a clamp, a spring clamp, a latch, a pin, a recess, a protrusion, a groove, a bracket, a clamp mount, a screw mount, a bayonet mount, a friction mount, a smooth surface, a fastener suction pad, an adhesive pad, an elastic cord, or any combination thereof.

It may be advantageous to use a fastener that does not require an energy source to achieve some fastener strength. For example, one or more permanent magnets, one or more bistable magnets that the user can move mechanically. This can prevent unwanted detachment during a power failure and/or startup/shutdown.

If an energy source is contained in the support surface, this may be advantageous for one or more electromagnets. For example, a bistable latching solenoid that is formed and arranged such that it upholds a fixed position without the energy source. In this case, a power source is required to reduce some degree of fastening strength, which may also prevent unwanted detachment during a power failure and/or startup/shutdown.

Optionally, the holder 100 in FIG. 1 may additionally have a protrusion to increase the surface area to which the one or more fasteners may be mechanically upheld. It may be convenient to mechanically connect such a protrusion to the first edge clamp 110 and/or the second 115 edge clamp. However, indirectly fixing one or more fixing means to the first edge clamp 110 and/or second edge clamp 115 may increase the force that must be applied (the first ejection force 300) to eject the mobile device 200. In this case, it is preferable to use less rigid materials and/or to provide a further protrusion that comprises one or more fasteners that are not connected to the first edge clamp 110 and/or to the second edge clamp 115.

Figure 2A:
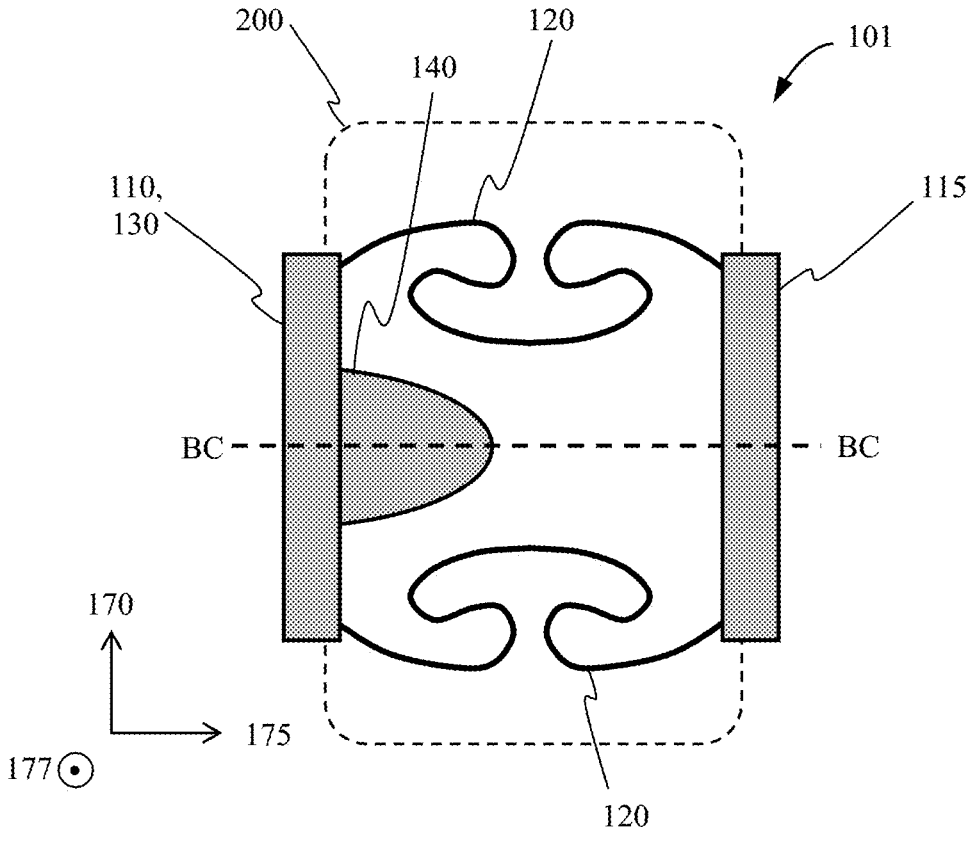
FIGS. 2A, 2B and 2C show a top view of a second embodiment of the holder of mobile devices and two cross-sections through the edge clamp.
Figure 2B:
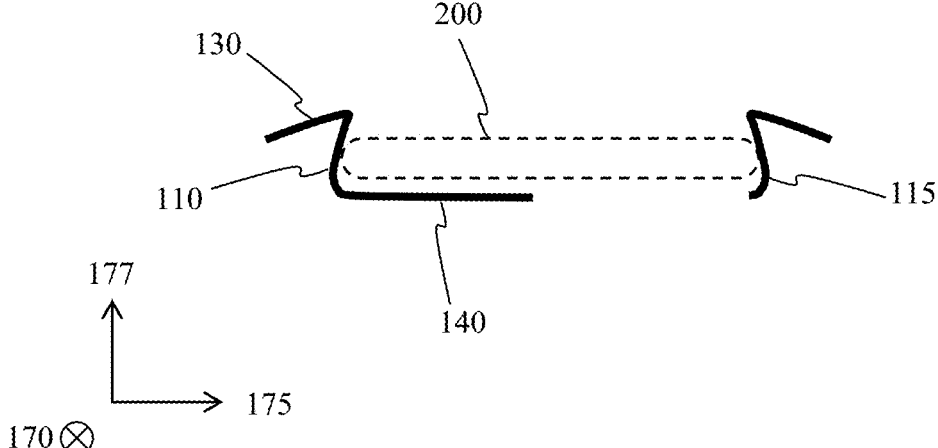
Figure 2C:
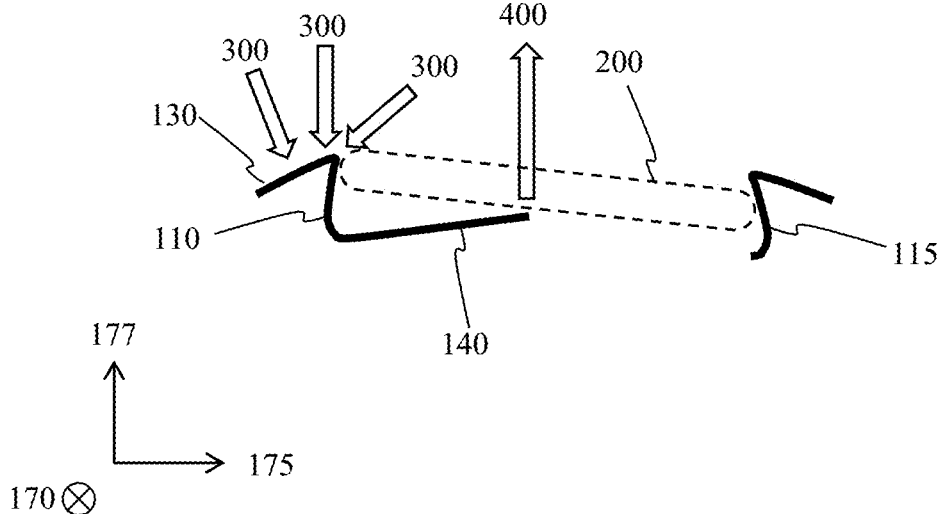

FIGS. 2A, 2B, and 2C show a top view of a second embodiment of the holder 101 for mobile devices and two cross-sections through the edge clamps 110, 115.

The holder 101 in FIG. 2 is identical to the first embodiment (holder 100) described above with respect to FIG. 1, with one exception. The second edge ejector 135 is similarly mechanically connected to the second edge clamp 115, but instead of being located as a tab at only one location, it extends substantially the entire extent of the second edge clamp 135 along the first axis 170. This is advantageous to the user because the third predetermined ejector force can be applied at any position. The first edge ejector 130 is similarly mechanically connected to the first edge clamp 110, but instead of being located as a tab at only one location, it extends substantially the entire extent of the first edge clamp 130 along the first axis 170. This is advantageous to the user because at any position, the first predetermined ejection force 300 can be applied. However, see below for additional training requirements due to an additional ejection protrusion 140.

The holder 101 comprises a second extension resistance 120, which also comprises one or more serpentine or zigzag shaped form elements which are formed and arranged such that they provide a region of non-linear resistance to separation of the first edge clamp 110 and the second edge clamp 115.

For the holder 101, the first and second extension resistances 120 are formed and arranged such that they resist separation of the first edge clamp 110 and the second edge clamp 115 along the second axis 175, similar to the functionality described above for the single extension resistance 120 contained within the holder 100. This may be advantageous as higher degrees of extension resistance force and/or smaller sized extension resistances 120 may be provided to provide a similar degree of extension resistance.

The use of two extension resistances 120 results in a more symmetrical appearance that resembles a violin-like or cotiate-like shape.

The holder 101 further comprises a first ejection protrusion 140. Said first ejection protrusion functions similarly to the C-shaped edge clamping wall surface described above. The first ejection protrusion is described in more detail below.

FIG. 2A shows a top view of the holder 101 as seen from the side where the mobile device 200 is inserted and/or removed.

FIG. 2B shows a cross-section of the edge clamp along the line BC-BC shown in FIG. 2A. The contour of the cross-section of the mobile device 200 is shown by the dashed lines. FIG. 2B shows the situation after the mobile device 200 is inserted and the extension resistances 120 resist the edge clamps 110, 115 separating along the second axis 175.

The first ejection protrusion 140 is mechanically connected to the first edge ejector 130 and is formed and arranged such that the edge clamp 110 rotates about the first axis 170 when the first predetermined ejection force 300 is applied against the first edge ejector 130.

FIG. 2C shows a cross-sectional view of the edge clamp 110, 115 along the line BC-BC (shown in FIG. 2A), at that moment in which a proximal edge of the mobile device 200 is released from the first edge clamp 110. As shown in FIG. 2C, the first ejection protrusion 140 is further formed and arranged to exert a second predetermined ejection force 400 against the mobile apparatus 200 along a third axis 177. This may be particularly advantageous as the degree of manual lifting that may be required to remove the mobile device 200 from the cradle 101 is strongly reduced, and in some embodiments is no longer required. Accordingly, the first predetermined ejection force 300 may be reduced.

The third axis 177 intersects the first axis 170 and the second axis 175. Optionally, wherein the second axis 175 and the third axis 177 may intersect substantially perpendicularly.

Although not shown in FIG. 2, the holder 101 may optionally comprise one or more fixing means which are formed and arranged such that the holder 101 to be rigidly fixed to a support surface (not shown). The considerations are similar to those described above for the holder 100 of FIG. 1.

However, the fastener 101 of FIG. 2 further comprises the first ejection protrusion 140. The relatively large surface area makes it to be a convenient component to which the one or more fastening means can be mechanically fixed. However, fixing one or more fastening means to the first ejection protrusion 140 may significantly increase the force that must be provided, namely the first ejection force 300, to eject the mobile device 200.

For example, if the first edge clamp 110, the first edge ejector 130, and the first ejection protrusion 140 are made of rigid materials and are rigidly connected to each other, then each fastener comprised in the first ejection protrusion 140 will provide a high degree of resistance to rotation of the edge clamp 110 about the first axis 170. As a test, a permanent magnet having a diameter of about 19 mm was inserted into the first ejection protrusion 140, and the bearing surface was made of a ferromagnetic metal that provides a high degree of fixing. In the absence of fixation means, the first ejection force 300 was typically in the range of 6 to 10 Newtons. After inclusion of the permanent magnet, the first ejection force 300 was 12 to 15 Newtons.

If increasing the first ejection force 300 is not acceptable in certain embodiments, it is preferable to use less rigid materials and/or provide another protrusion with one or more fasteners that is not connected to the first edge clamp 110 or second edge clamp 115.

Figure 3A:
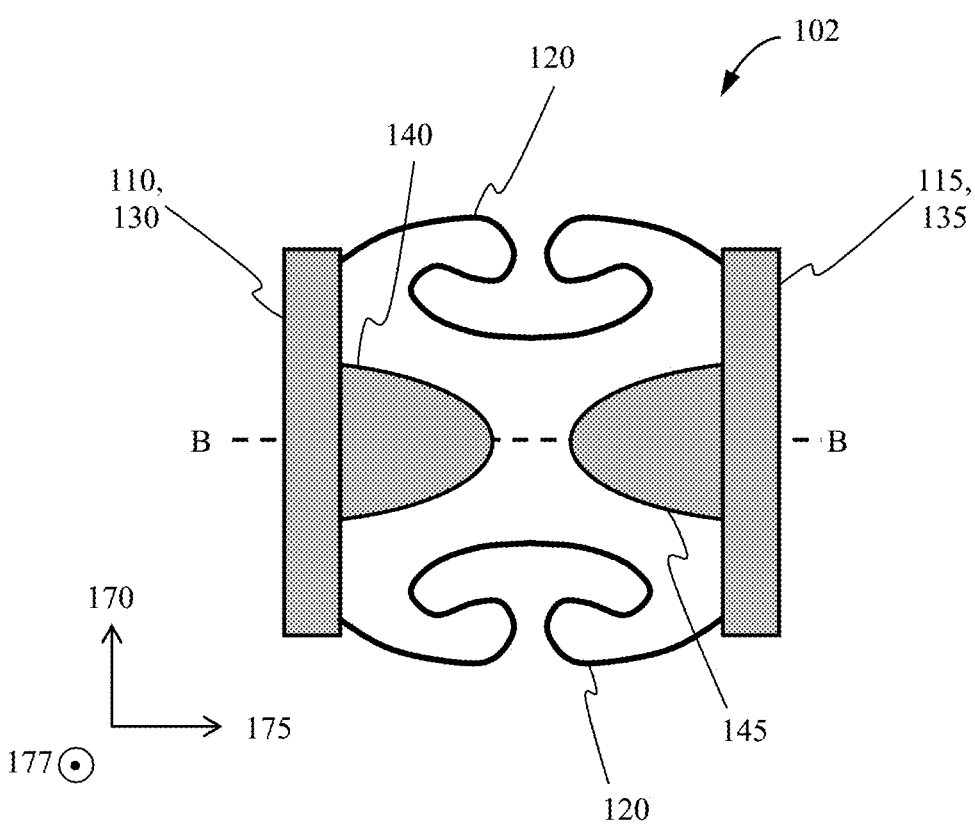
FIGS. 3A and 3B show a top view of a third embodiment of the holder of mobile devices and a cross-sectional view of the edge clamp.
Figure 3B:
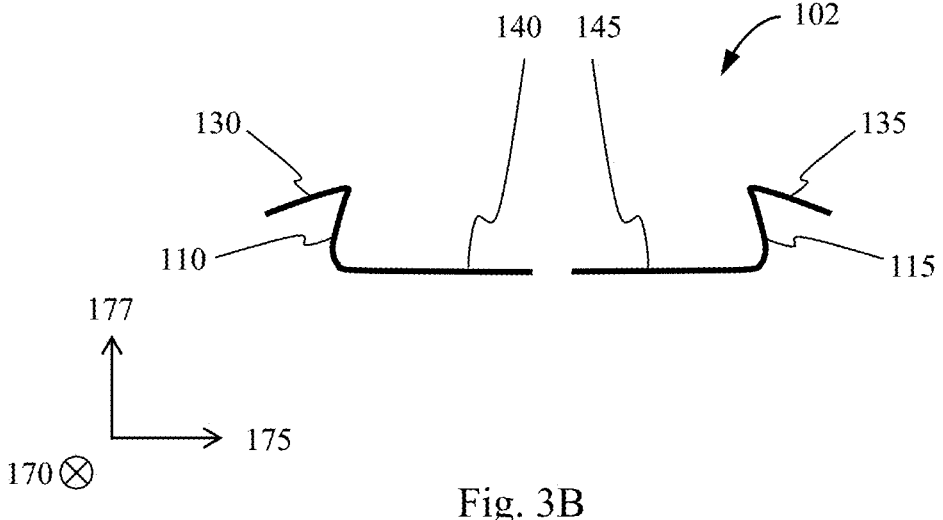

FIGS. 3A and 3B show a top view of a third embodiment of the mobile device holder 102 and a cross-sectional view of the edge clamp.

The holder 102 of FIG. 3 is identical to the second embodiment (holder 101) with one exception, described above with respect to FIG. 2. The holder 102 further comprises a second ejection protrusion 145, which functions in a similar manner to the first ejection protrusion 140 and is described in more detail below.

FIG. 3A shows a top view of the holder 102 as viewed from the side where the mobile device 200 is inserted and/or removed.

FIG. 3B shows a cross-sectional view of the edge clamp along line B-B shown in FIG. 3A. The contour of the cross-section of the mobile device 200 is shown by dashed lines. FIG. 3B shows the situation after the mobile device

200 is inserted and the extension resistances 120 resist the edge clamps 110, 115 separating along the second axis 175.

Similar to the holder 101 of FIG. 2, the first ejection protrusion 140 is mechanically connected to the first edge ejector 130 and is formed and arranged such that it turns the first edge clamp 110 about the first axis 170 when the first predetermined ejection force 300 is applied against the first edge ejector 130.

However, the holder 102 of FIG. 3 further comprises the second ejection projection 145, which is mechanically connected to the second edge ejector 135 and is formed and arranged such that it turns the second edge clamp 115 about the first axis 170 when the third predetermined ejection force (not shown, but analogous to the first ejection force 300) is applied against the second edge ejector 135.

The instant at which the proximal edges of the mobile device 200 are released from the first edge clamp 110 and the second edge clamp 115 is not shown. Reference is made to FIG. 2C, which shows a one-sided ejection. The holder 102, as shown in FIG. 3, is formed in an analogous manner for two-sided ejection.

Similar to the holder 101 of FIG. 2, the first ejection protrusion 140 is further formed and arranged such that it exerts a second predetermined ejection force 400 against the mobile device 200 along a third axis 177.

However, the holder 102 of FIG. 3 further comprises the second ejection protrusion 145, which is formed and arranged such that it exerts a fourth predetermined ejection force against the mobile device 200 along a third axis 177.

This may be particularly advantageous as the degree of manual lifting that may be required to remove the mobile device 200 from the cradle 102 is greatly reduced and, in some embodiments, is no longer required. The first predetermined ejection force 300 and the third predetermined ejection force may both be reduced.

Similar problems as mentioned above may occur if one or more fixing means are comprised in the first ejection protrusion 140 and/or the second ejection protrusion 145. It may be advantageous to include strong fixing means in only one ejection projection 140, 145. This allows for both improved ejection (limited to only one side) and strong fixing.

Figures 4A, 4B:
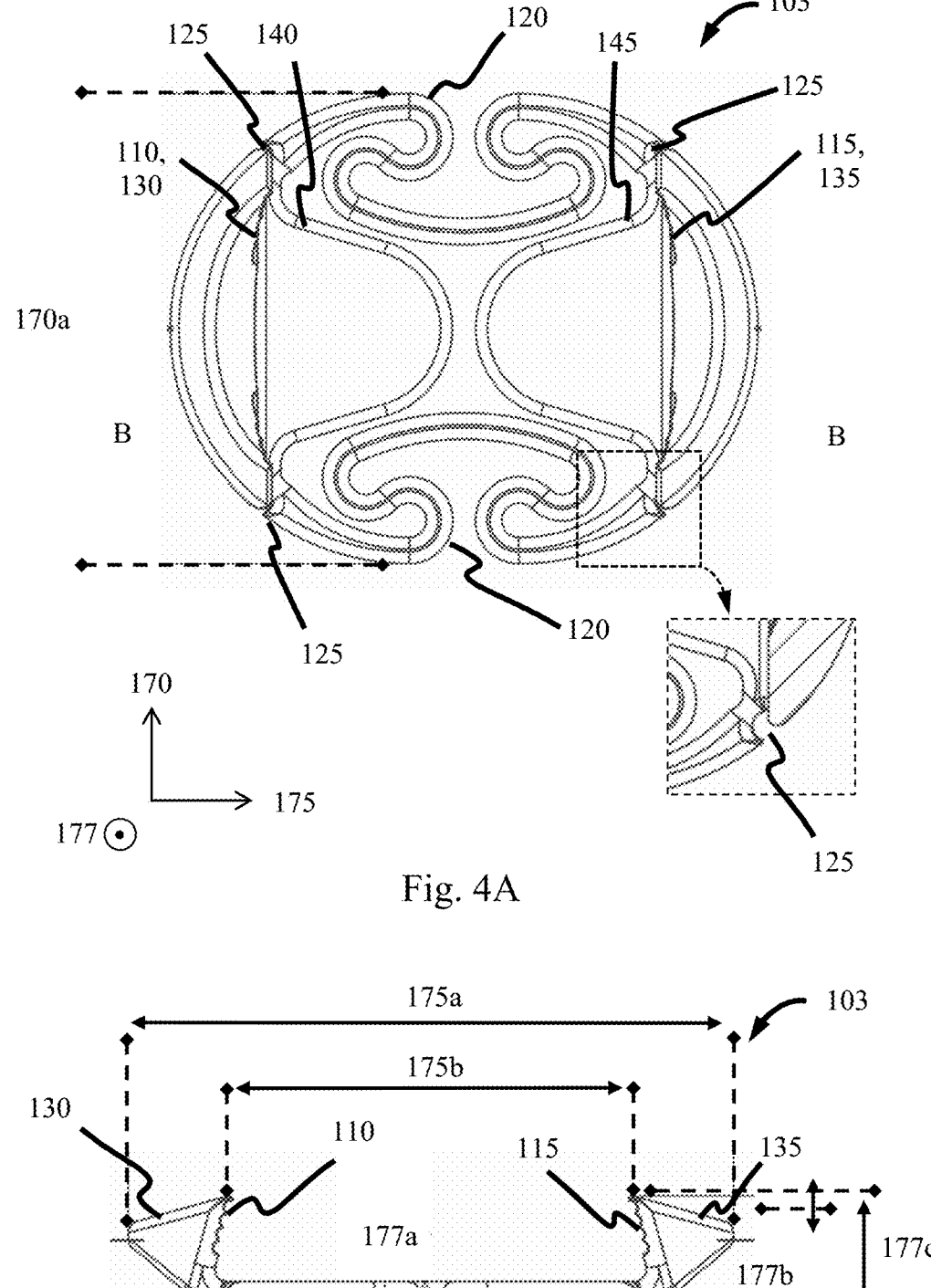
FIGS. 4A and 4B show a scaled plan view of a fourth embodiment of the holder of mobile devices and a scaled cross-section through the edge clamp.

FIGS. 4A and 4B show a scaled plan view of a fourth embodiment of the mobile device holder 103 and a scaled cross-sectional view of the edge clamp.

The scale drawings should not be interpreted as limiting the invention to specific dimensions and ratios. They are merely intended to provide the person skilled in the art with a starting point for further evaluation and routine experimentation. By following routine steps guided by the general instructions in the remainder of this disclosure, the person skilled in the art will be able to provide a wide variety of holders suitable for upholding a diversity of apparatus.

The holder 103 of FIG. 4 is identical to the third embodiment (holder 102) described above with respect to FIG. 3, with one exception. The views are less schematic and to scale. The wall surfaces of the edge clamp 130, 135 facing the edges of the apparatus 200 are curved, concentrating the clamping at two positions near opposite ends of the edge clamp 130, 135. This curvature provides a convenient recess to reduce the likelihood that a button will be pressed. Such buttons are commonly found on the edges of edge clamps 200. The gripping portions of the first edge ejector 130 and the second edge ejector 135 of the edge clamps 110, 115 have ribs to improve gripping. These can be seen in cross-section in FIG. 4B

Similar to the holder 102 of FIG. 3, the holder 103 comprises two extension resistances 120. However, in the holder 103, each extension resistance 120 comprises two hinges 125, one at each connection point between the extension resistance 120 and the rest of the holder 103. In other words, the holder 103 comprises four hinges 125. As can be seen from the enlargement, each hinge 125 has one or more cross-sectional reductions. More specifically, each hinge 125 comprises one or more hinges. More specifically: Each hinge 125 comprises two adjacent tapers that form a longitudinal profile resembling an hourglass. This can be advantageous because it provides a pivot point at the smallest cross-section used when the edge clamps 110, 115 are moving apart (a larger separation distance) and/or when they are moving together (a smaller separation distance).

The holder 103 is substantially monolithic, having been formed from a polybutadiene, a silicone rubber, a synthetic rubber, natural rubber, and/or a material having properties such as natural rubber.

The ejection projections 140, 145 are not used as such. Each further comprises a permanent magnet for securing the holder 103 to a support surface. Due to the elasticity of the polyurethane, the mobile device is ejected solely by applying the first ejection force to the first edge ejector 130 of the first edge clamp 110 and/or by applying the third ejection force to the second edge ejector 135 of the second edge clamp 115.

FIG. 4A shows a scaled top view of the holder 103 as viewed from the side where the mobile device 200 is inserted and/or removed.

In this example, the maximum perpendicular extent 170*a* along the first axis 170 (or height when viewed from the side where the apparatus 200 is inserted and/or removed) is about 60 mm.

FIG. 4B shows a cross-section of the edge clamp to scale along line B-B shown in FIG. 4A. FIG. 4B shows the situation where no mobile device was used.

In this example, the maximum perpendicular extent 175*a* along the second axis 175 (or width when viewed from the side where the apparatus 200 is inserted and/or removed) is about 75 mm.

In this example, the average perpendicular separation distance 175*b* along the second axis 175*b* at the top, as shown in FIG. 4B, can be considered the minimum separation distance. Here it is about 52 mm, so the holder 103 would be recommended for devices 200 having an elongation of 52 mm and higher.

The moment at which the proximal edges of the mobile device 200 are released from the first edge clamp 110 and the second edge clamp 115 is not shown. Reference is made to FIG. 1C, which shows a one-sided ejection. The holder 103, as shown in FIG. 4, is formed in an analogous manner for two-sided ejection. As described above, in this embodiment the ejection projections 140, 145 are not used as such.

In this example, the two wall surfaces of the edge clamps 110, 115 are slightly inclined to each other, so that the separation distance 175*b* is slightly smaller on the side of the mobile device 200 facing away from the holder 100 (the upper side as shown in FIG. 4B). Here, the upper separation distance 175*b* is about 52 mm, and the lower separation distance is about 55 mm In other words, the two wall surfaces of the edge clamps 110, 115, as viewed in cross-section of FIG. 4B, each form an angle with the second axis 175 of less than 90 degrees (less than perpendicular), preferably about 75 degrees. Here, the angle on each side is about 78 degrees.

The maximum vertical extension 177*a* is shown along the third axis 177 of an extension resistance 120 (thickness). Here it is about 3.4 mm and the cross-section of the extension resistance 120 is approximately circular. Thus, the outer diameter of the cross-section is approximately 3.4 mm.

The mean vertical extension 177*b* is shown along the third axis 177 of a center plane of the edge clamp 110, 115. Here, it is approximately 8.5 mm. This is also approximately the greatest distance along the third axis 177 that the second edge ejector 135 can be moved to insert and/or remove the mobile device 200.

The average vertical extension 177*c* is shown along the third axis 177 of an upper plane (as shown) of the edge clamps 110, 115. Here it is approximately 14 mm. This is also approximately the maximum vertical extension along the third axis 177 of the holder (or the maximum thickness).

The average extension of the wall surfaces 110, 115 facing the edges of the mobile device 200 (when in use) is about 13 mm in the illustrated case.

Figure 4C:
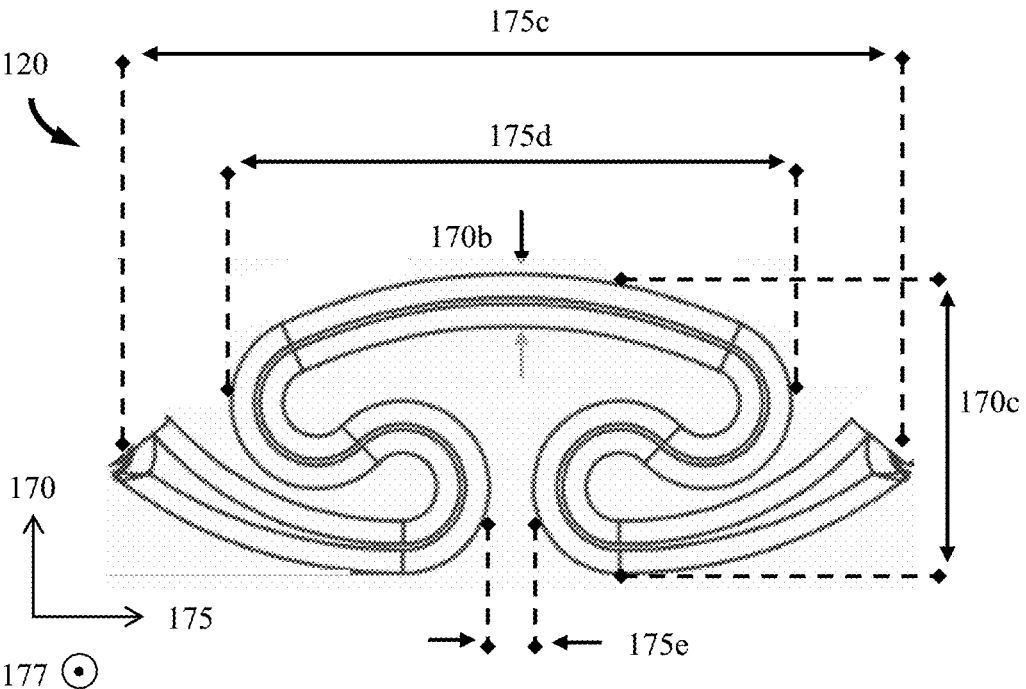
FIG. 4C is a scale drawing of a serpentine extension resistance.

FIG. 4C is a scale drawing of one of the two serpentine extension resistances 120 shown in FIGS. 4A (top view) and 4B (cross section).

The maximum perpendicular extent 170*b* is shown along the first axis 170 of one of the extension resistances 120 (thickness). Here, it is about 3.4 mm and the cross-section of the extension resistance 120 is approximately circular. Thus, the outer diameter of the cross section is approximately 3.4 mm The maximum perpendicular extension 175*c* is shown along the second axis 175 of the serpentine extension resistance 120 between the connection points with the rest of the holder 103 (or width). In this case, the connection points comprise hinges 125 on each side, so it is approximately the extension between the hinges 125, in which case it is approximately 50.5 mm.

The maximum perpendicular extension 170*c* is shown along the first axis 170 of the serpentine extension resistance 120 (or height). In this case, it is approximately 19 mm.

The maximum perpendicular extension 175*d* is shown6 along the second axis 175 of the main meander of the serpentine extension resistance 120 (or width). In this case, it is approximately 36 mm.

The minimum vertical separation distance 175*e* is shown along the second axis 175 between the branches of the meander of the serpentine resistance 120. In this case it is about 3 mm.

Figure 5:
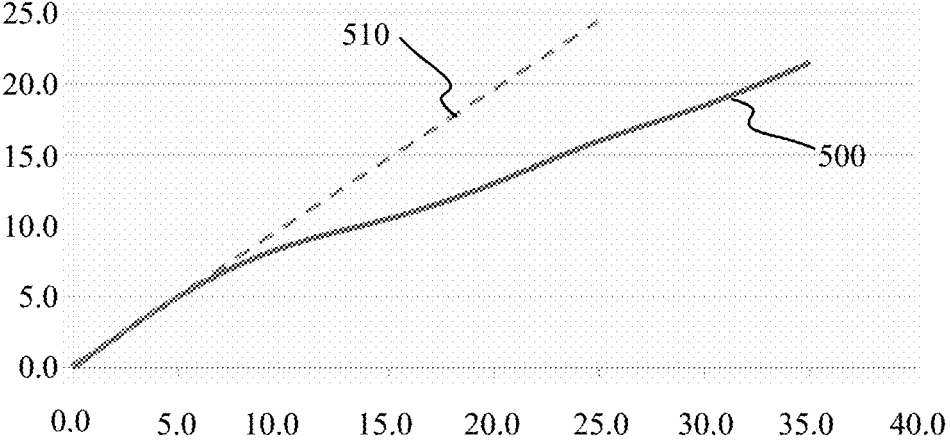
FIG. 5 shows a extension force characteristic that comprises a region of nonlinear resistance.

FIG. 5 shows an example of an extension force characteristic curve 500 that comprises a region of nonlinear resistance due to the use of a serpentine extension resistance 120. It is shown as a curve 500 using a solid line.

The force exerted by an extension resistance in Newtons is plotted along the vertical (or y) axis from 0.0 N to 25.0 N. The of the extension resistance in mm is plotted along the horizontal (or x-) axis from 0.0 mm to 40.0 mm.

The elongation force characteristic 500 passes through the following points:

| Elongation [mm] (x) | Force [N] (y) |
| --- | --- |
| 0.0 | 0.0 |
| 5.0 | 5.0 |
| 10.0 | 8.5 |
| 15.0 | 10.5 |
| 20.0 | 13.0 |
| 25.0 | 16.0 |
| 30.0 | 18.5 |

FIG. 5 further shows a linear extension-force characteristic 510, shown as a dashed straight line. It passes through the (x,y) points (0,0); (5,5); (10,10); (15,15); (20,20) and (25,25). This represents a typical extension-resistance characteristic of a linear spring, such as a coil spring.

The nonlinear extension characteristic 500 follows the linear extension force line 510 from the (x,y) point (0,0) to about (6 mm, 6 N). From this point, the nonlinear characteristic 500 provides a smaller increase in extension force (or separation resistance) than the linear characteristic 510 for larger separation distances (in this case, for separations greater than about 10 mm). In this case, this means that the holder according to the invention allows for easier insertion, easier removal, and easier uphold of a wide range of sizes of the mobile device 200 because the amount of force required by the user to separate the edge clamp 110, 115 is less. For example, when a non-linear resistance 500 is used in which the distance is approximately 25 mm, instead of a force of 25 N (newtons), a force of 16 N (newtons) must be countered.

LIST OF REFERENCE SIGNS

| No. | Designation |
| --- | --- |
| 100 | Holder - first embodiment |
| 101 | Holder - second embodiment |
| 103 | Holder - third embodiment |
| 104 | Holder - fourth embodiment |
| 110 | a first edge clamp |
| 115 | a second edge clamp |
| 120 | one or more extension resistances |
| 125 | one or more hinges |
| 130 | a first edge ejector |
| 135 | a second edge ejector |
| 140 | a first ejection protrusion |
| 145 | a second ejection protrusion |
| 170 | first axis (e.g. x) |
| 170a | maximum perpendicular extension along the first axis (height) |
| 170b | maximum perpendicular extension along first axis of one of the extension resistances (thickness) |
| 170c | maximum perpendicular extension along the first axis of a serpentine resistance |
| 175 | second axis (e.g. x or y) |
| 175a | maximum perpendicular extension along the second axis (width) |
| 175b | average perpendicular separation distance along the second axis (minimum range) |
| 175c | maximum perpendicular extension along the second axis of serpentine resistance (between connection points) (or width) |
| 175d | maximum perpendicular extension along the second axis of the main meander of the serpentine resistance |
| 175e | minimum vertical separation distance along the second axis between arms of a serpentine resistance meander |
| 177 | third axis (e.g. z) |
| 177a | maximum perpendicular extension along the third axis of extension resistance (thickness) |
| 177b | Mean vertical extension along the third axis of the center plane of the edge clamps |
| 177c | mean vertical extension along the third axis of the upper plane (as shown) of the edge clamp |
| 200 | mobile device |
| 300 | first predetermined ejection force |
| 400 | a second predetermined ejection force |
| 500 | a extension force characteristic with a range of nonlinear resistance |
| 510 | a linear extension-force characteristic |

The invention claimed is:

1. Holder (100, 101, 102, 103) for a mobile device (200), wherein the holder comprises (100, 101, 102, 103):

a first (110) and a second (115) edge clamp, each extending along a first axis (170) and formed and arranged to cooperate along a second axis (175) to rigidly clamp opposing edges of the mobile device (200), wherein the second axis (175) intersects the first axis (170);

one or more extension resistances (120) formed and arranged to resist a separation of the first edge clamp (110) and the second edge clamp (115) along the second axis (175);

a first edge ejector (130) mechanically connected to the first edge clamp (110) and formed and arranged such that it turns the first edge clamp (110) about the first axis (170) to release a proximal edge of the mobile device (200) when a first predetermined ejection force (300) is applied against the first edge ejector (130);

wherein the one or more extension resistances (120) comprises one or more serpentine or zigzag shaped form elements formed and arranged to provide a region of non-linear resistance to separation of the first (110) and second (115) edge clamps.

2. Holder according to claim 1, wherein the first edge clamp (110) and the second edge clamp (115) are formed and arranged to rigidly uphold substantially parallel edges of a mobile device (200).

3. Holder according to claim 1, wherein one or more extension resistances (120) are formed and arranged to resist a separation of the first edge clamp (110) and the second edge clamp (115) in a plane comprising the first axis (170) and the second axis (175).

4. Holder according to claim 1, wherein the one or more extension resistances (120) comprise one or more hinges disposed along one or more of the two extension resistances (120) or between one or more of the two extension resistances (120) and the first edge clamp (110) and/or the second edge clamp (115), the hinges being formed and arranged such that the one or more extension resistances provide a region of non-linear resistance.

5. Holder according to claim 4, wherein the one or more hinges (125) have one or more indentations, one or more notches, one or more grooves, one or more protrusions, one or more elevations, one or more ribs, one or more cross-sectional reductions, one or more tapers, one or more barrel sections, one or more hourglass sections, one or more spherical sections, one or more hemispherical sections, one or more cylindrical sections, or any combination thereof.

6. Holder according to claim 1, wherein the first edge clamp (110), the second edge clamp (115), the one or more extension resistances (120), one or more hinges (125), or any combination thereof comprise one or more elastomers or a combination of elastomers.

7. Holder according to claim 6, wherein one or more elastomers is/are a polybutadiene, a synthetic rubber, a silicone rubber, or a natural rubber.

8. Holder according to claim 1, wherein the first edge ejector (130) is further formed and arranged such that it moves the first edge clamp (110) away from the second edge clamp (115) to release the proximal edge of the mobile device (200) when the first predetermined ejection force (300) is applied against the first edge ejector (130).

9. Holder according to claim 1, wherein the holder (100, 101, 102, 103) further comprises a first ejector protrusion (140) mechanically connected to the first edge ejector (130) and constructed and arranged to turn the first edge clamp (110) about the first axis (170), when the first predetermined ejection force (300) is exerted against the first edge ejector (130), whereby the first ejection projection (140) exerts a second predetermined ejection force (400) against the movable apparatus (200) along a third axis (177), wherein the third axis (177) intersects the first (170) and second axes (175).

10. Holder according to claim 1, wherein the holder (100, 101, 102, 103) further comprises a second edge ejector (135)

mechanically coupled to the second edge clamp (115) and so formed and arranged to turn the second edge clamp (115) about the first axis (170) and/or move the second edge clamp (115) away from the first edge clamp (110) to release the proximal edge of the mobile device (200) when a third predetermined ejector force is applied against the second edge ejector (135).

11. Holder according to claim 1, wherein the holder (100, 101, 102, 103) further comprises one or more fixing means formed and arranged to enable the holder (100, 101, 102, 103) to be rigidly upheld to a support surface.

12. Holder according to claim 10, wherein one or more fasteners comprises a magnet, an electromagnet, a solenoid, a ferromagnetic metal, an adhesive, an adhesive pad, a hook fastener, a loop fastener, a threaded fastener, a threaded hole, a clamp, a spring clip, a latch, a pin, a recess, a protrusion, a groove, a bracket, a clip mount, a screw mount, a bayonet mount, a friction mount, a smooth surface, a fastener suction pad, an adhesive pad, an elastic cord, or any combination thereof.

13. Holder according to claim 11, wherein the one or more fixing means is/are mechanically fixed to the first ejection protrusion (140).

14. Holder according to claim 1, wherein the first axis (170) and the second axis (175) intersect substantially perpendicularly.

15. Holder according to claim 9, wherein the second axis (175) and the third axis (177) intersect substantially perpendicularly.

16. Holder according to claim 1, wherein the first predetermined ejection force (300) is suitable for manual application by a human.

17. Holder according to claim 1, wherein the first predetermined ejection force (300) is suitable for manual application by a human hand.

18. Holder according to claim 1, wherein the first predetermined ejection force (300) is in the range of 6 to 10 Newtons.

19. Holder according to claim 10, wherein the holder (100, 101, 102, 103) further comprises a first ejector protrusion (140) mechanically connected to the first edge ejector (130) and constructed and arranged to turn the first edge clamp (110) about the first axis (170), when the first predetermined ejection force (300) is exerted against the first edge ejector (130), whereby the first ejection projection (140) exerts a second predetermined ejection force (400) against the movable apparatus (200) along a third axis (177), wherein the third axis (177) intersects the first (170) and second axes (175), and wherein a second edge ejector protrusion (145) is mechanically connected to the second edge ejector (130) (135) and formed and arranged to turn the first edge clamp (110) about the first axis (170) when the third predetermined ejection force is applied against the second edge ejector (135), whereby the second edge ejector (145) applies a fourth predetermined ejection force against the mobile device (200) along the third axis (177).

20. Holder according to claim 19, wherein the second predetermined ejection force (400) and the fourth predetermined ejection force are substantially different, similar, or substantially the same.

21. Holder according to claim 19, wherein the first predetermined ejection force (300) and the third predetermined ejection force are substantially different, similar, or substantially the same.

22. Holder according to claim 19, wherein the first predetermined ejection force (300) and the third predetermined ejection force are suitable for manual application by two portions on one hand of a human.

23. Holder according claim 19, wherein the third predetermined ejection force is suitable for manual application by a human.

24. Holder according claim 19, wherein the third predetermined ejection force is suitable for manual application by a human hand.

\* \* \* \* \*